Nov. 4, 1969
C. BERGER
3,476,607
DEFERRED ACTION SELF-TIMING FUEL CELL
Filed March 25, 1965
*Fig. 1*
*Fig. 2*
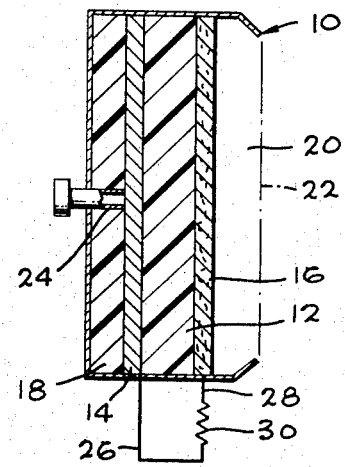
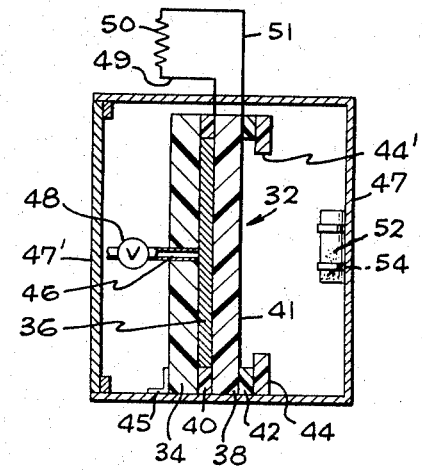
*Fig. 3*
*Fig. 4*
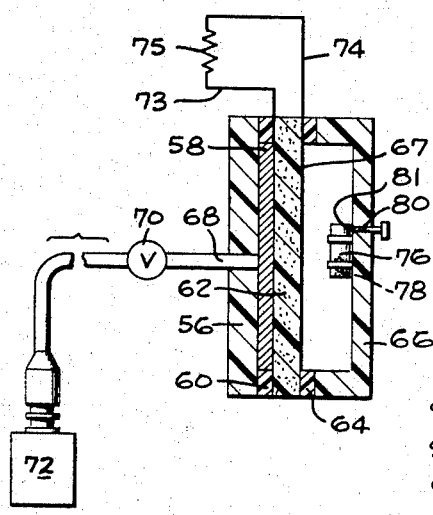
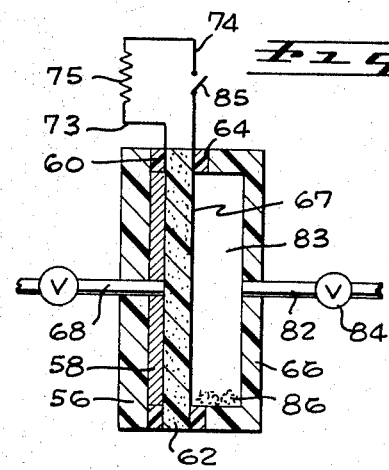
*Fig. 5*
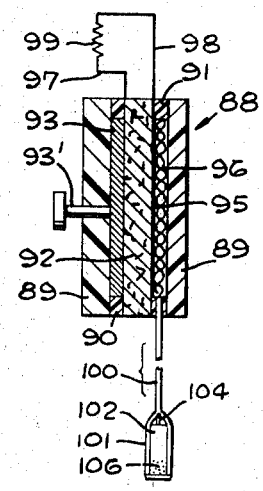
CARL BERGER
INVENTOR
Max Gilden
ATTORNEY

United States Patent Office 3,476,607
Patented Nov. 4, 1969

3,476,607
DEFERRED ACTION SELF-TIMING FUEL CELL
Carl Berger, Santa Ana, Calif., assignor to McDonnell Douglas Corporation, Santa Monica, Calif., a corporation of Maryland
Filed Mar. 25, 1965, Ser. No. 442,715
Int. Cl. H01m 27/04
U.S. Cl. 136—86                                   5 Claims

ABSTRACT OF THE DISCLOSURE

Self-timing fuel cell designed to operate and to generate an electric current for a predetermined short time interval, comprising an ion conducting material, a hydrogen catalyst electrode having one side in contact with the ion conducting material, the catalyst electrode being capable of absorbing hydrogen, e.g., a palladium catalyst electrode, mechanical means hermetically sealing the opposite side of the hydrogen electrode, a predetermined amount of hydrogen absorbed in the hydrogen electrode, a reducing catalyst electrode such as an oxygen catalyst electrode positioned on the other side of the ion conducting material, a zone adjacent the reducing catalyst electrode and means for supplying to such zone an oxidizer such as oxygen gas, capable of being reduced at the reducing electrode into an ion which reacts with the hydrogen ion.

---

This invention relates to fuel cells designed to operate for a short period of time, and is particularly concerned with small compact fuel cells, preferably hydrogen-oxygen fuel cells, having a rate controlling electrode and which can be set to operate for a predetermined short interval of time.

In certain types of operation the generation of small amounts of electrical power for a short period of time, e.g., of the order of 2 to 6 seconds, is required. For this purpose, it has been the practice to employ battery power supplies employing an electronic timer. However, systems of this type do not operate satisfactorily for such short periods of operation.

It is accordingly an object of the invention to provide a small compact device for generation of small amounts of electrical power for short time periods of the order of seconds, reliably and efficiently.

Another object of the invention is the provision of a fuel cell having the above noted characteristics, and which is selectively operable for a short predetermined time interval, e.g., of the order of seconds.

Another object of the invention is to provide a novel fuel cell which has a rate controlling electrode and which is designed to consume only a predetermined amount of fuel and resulting in cut-off of the cell operation when such predetermined amount of fuel has been consumed.

Other objects and advantages of the invention will appear hereinafter.

According to the invention, a self-timing fuel cell, i.e., a fuel cell designed to operate and to generate an electric current for a predetermined short time interval, is provided which comprises an ion conducting material, a hydrogen catalyst electrode functioning as anode positioned on one side of such ion conducting material, said catalyst being capable of absorbing hydrogen, preferably a palladium catalyst, and means for introducing a predetermined amount of hydrogen to such hydrogen electrode for absorption therein. A second catalyst electrode or cathode, referred to herein broadly as a reducing electrode, is positioned on the other side of the ion conducting material, a zone is provided adjacent such second catalyst electrode, and means is provided for supplying to such zone a material capable of being transformed at said second electrode into a substance which reacts with hydrogen as hydrogen ion. Such material is herein referred to as an oxidizer, preferably a gas such as oxygen which is capable, for example, of reacting with the hydrogen at the second electrode.

The term "oxidizer" as employed herein is intended to denote any material which is capable of being reduced at the reducing electrode or cathode, such as oxygen, e.g., to form an ion such as a hydroxyl ion, such reduced material then reacting with the hydrogen ion at the reducing cathode or at the palladium anode.

In accordance with the invention concept, a given amount of hydrogen gas is permitted to diffuse into and become absorbed in the hydrogen electrode, preferably palladium. Since the hydrogen electrode is sealed from the external environment, no gas exists above or adjacent to the hydrogen electrode. This quantity of gas accordingly is rate controlling and the device is so designed that it will fail as soon as the hydrogen gas supply absorbed in the hydrogen electrode is depleted. Such a time span can be of the order of say 2 to 6 seconds. The zone or chamber adjacent to the other or reducing electrode, e.g., the oxygen chamber, can be sealed or open as described more fully hereinafter, and a captive or sealed source of oxidizer, which can be in solid or fluid form, preferably a sealed source of oxygen, e.g., contained in a fracturable container or vial, may be provided to such reducing electrode by breaking or fracturing the vial with the oxidizer, e.g., oxygen, flowing or diffusing to the electrode surface.

Thus, the rate controlling or hydrogen electrode is set by absorbing exactly the amount of hydrogen which is required for cut-off. The other electrode compartment, e.g., the oxygen compartment, and which may be sealed or open, is required for fuel cell operation but is not time dependent since the coulombic quantity of oxidizer such as oxygen or air, which is provided is substantially greater than the amount of hydrogen absorbed in the hydrogen electrode. Output of such fuel cell is usually in the range of about 0.1 to about 0.8 volt with a current density ranging from less than 1 ma. (millamps)/cm.$^2$ to about 50 ma./cm.$^2$.

According to the invention, the only hydrogen employed in the fuel cell is that which is absorbed in the hydrogen electrode. No hydrogen compartment exists since the hydrogen electrode is sealed against the outer or exit wall. On the other hand, the chamber adjacent the reducing electrode, e.g., the oxygen chamber, can contain or the fuel cell designed to deliver to such chamber a sufficient or excess amount of oxidizer or oxygen which is required for reaction with all of the hydrogen absorbed in the hydrogen electrode during the short period of fuel cell operation, as described more fully hereinafter.

The invention will be more clearly understood by reference to the various embodiments thereof described below in connection with the accompanying drawing wherein:

FIG. 1 illustrates schematically a fuel cell generally, which can be employed in the invention system;

FIG. 2 shows a cross sectional view of one form of fuel cell according to the invention;

FIG. 3 is a cross section of another modification of fuel cell according to the invention;

FIG. 4 represents still another embodiment of the fuel cell of the invention; and FIG. 5 shows a still further modification of the fuel cell of the invention.

It will be understood that the showings in the drawings are exaggerated for purposes of greater clarity.

Referring to FIG. 1 of the drawing showing schematically a fuel cell which can be employed according to the invention, such fuel cell indicated at 10 comprises an ion conducting material or membrane 12 which serves to conduct ions between the electrodes, a hydrogen catalyst electrode 14, i.e., a palladium electrode which absorbs hydrogen, positioned in contact with one side of the membrane 12, and a second reducing catalyst electrode 16, e.g., a so-called oxygen catalyst electrode, positioned against the other side of the membrane. Numeral 18 represents the cell wall sealing the hydrogen electrode 14 from the external environment, such cell wall being in close physical contact with the adjacent outside surface of the hydrogen electrode 14. The numeral 20 represents an oxygen chamber which may be sealed or open as indicated by the dotted line 22. An inlet 24 is provided for introducing a predetermined quantity of hydrogen into the palladium electrode 14 for diffusion and absorption therein.

According to the invention, the hydrogen or rate controlling electrode 14 is composed of a material which will absorb hydrogen in a predetermined or specified amount, and which will store such hydrogen until operation of the cell is triggered, for example, by introduction of oxygen gas into the oxygen chamber indicated at 20 in FIG. 1, at a preselected time. A particularly suitable hydrogen absorbing or rate controlling electrode is one which is composed of palladium either in the form of the metal or a suitable alloy thereof. An especially advantageous palladium alloy for use as the rate controlling electrode is the palladium-silver alloy, e.g., containing about 5 to about 40% silver. Unless otherwise indicated, the term "palladium" is intended to denote in the specification and claims either pure palladium or an alloy thereof such as the above noted palladium-silver alloy. The hydrogen or palladium electrode, e.g., as indicated at 14 in FIG. 1, can be in the form of a foil or strip of palladium or the palladium may be coated onto one of the surfaces of the ion conducting material or membrane 12.

Palladium metal or its alloys such as the palladium-silver alloy have the capacity to store substantial amounts of hydrogen. This occurs due to the formation of a metal hydride. However, according to preferred practice of the instant invention, only a relatively small amount of hydrogen is absorbed in the palladium electrode to render the fuel cell operable only for a very short interval, e.g., of the order of seconds. When oxygen is introduced into the chamber 20 in FIG. 1 and into contact with the oxygen electrode, and the electrodes 14 and 16 are connected electrically in an external circuit indicated at 26 and 28 and including a resistance or load 30, hydrogen is released from the palladium electrode 14 and is oxidized at such electrode or anode to form hydrogen ion which migrates through the ion conducting membrane 12 and reacts with hydroxyl ion adjacent the oxygen catalyst electrode or cathode 16, such hydroxyl ion being formed by reduction of the oxygen in chamber 20 at such reducing catalyst electrode or cathode, forming water. Alternatively, where an alkaline electrolyte is employed, the hydroxyl ion will migrate through the ion conducting membrane 12 and react with hydrogen ion at the palladium electrode or anode 14, forming water. Since the fuel cell of the invention is designed essentially for operation and generation of an electric current for a relatively very short time interval, e.g., of the order of seconds, the amount of water formed, e.g., at the oxygen electrode 16 and present in the oxygen chamber 20, is insufficient to adversely affect the operation of the fuel cell for such short time interval or period.

It will be apparent from FIG. 1, that since there is essentially no space between the cell wall 18 and the adjacent hydrogen electrode 14 and the electrode 14 is sealed against the wall 18, the only hydrogen which is used in the fuel cell is that which is absorbed in the hydrogen electrode so that cut-off of the cell is achieved as soon as all of the absorbed hydrogen is released from the electrode 14.

Referring now to FIG. 2 of the drawing, there is shown a fuel cell 32 according to the invention which comprises a fiber glass back plate 34 in sealing engagement with a palladium-silver alloy foil 36 which in turn is in contact with one side of an ion conducting membrane 38, the outer edges of the foil electrode 36 being protected by a neoprene gasket 40. In this embodiment the ion conducting membrane 38 can be an organic cation exchanger cross-linked polystyrene plastic in a polypropylene or polyethylene medium, and marketed as an AMF–C313 membrane. A neoprene gasket 42 is positioned adjacent the opposite face of the membrane 38 and a fiber glass flange 44 is positioned against the outer face of such gasket. The central portion of one face of the ion conducting membrane 38 is coated with a platinum black catalyst at 41 serving as reducing or oxygen electrode. The assembly of members 34, 40, 38, 42 and 44 can be accomplished in any desired manner such as by use of any suitable adhesive or glue. A hydrogen inlet 46 is provided for introducing a specified amount of hydrogen via valve 48 into the palladium electrode 36.

The fuel cell 32 is mounted in any suitable manner, as shown at 45, inside a housing 47. It will be seen that as so mounted, the oxygen electrode or cathode 41 is open to the ambient atmosphere within housing 47, via the opening 44' provided by the flange 44. The palladium electrode 36 and the platinum black electrode 41 are connected in an external circuit by means of wires 49 and 51 and including a load or resistance 50. Mounted in any suitable manner on a wall of the housing 47 is a sealed container or vial 52, e.g., a frangible thin plastic container, and including a supply of an oxygen generating material such as alkali metal chlorate, e.g., sodium or potassium chlorate, or alkali metal peroxide, such as sodium or potassium peroxide, as indicated at 54.

In the embodiment of FIG. 2, a predetermined amount of hydrogen, e.g., a sufficient amount such that the fuel cell 32 will operate for a period of 4 to 6 seconds is introduced via valve 48 and inlet 46 into the palladium electrode 36, and the fuel cell 32 is then inserted into the housing 47 and mounted therein as indicated in FIG. 2. The external circuit including wires 49 and 51 are then properly connected to the fuel cell and the cover 47' of the housing placed in position. The housing can be mounted on a frame or vehicle (not shown) so that when the housing is subjected to a sharp jolt the frangible container 52 will fracture and the oxygen generating material 54 will release oxygen into the interior of the housing and into contact with the platinum black oxygen electrode 41, placing the cell in operation and generating an electric current in the external circuit. As soon as all of the hydrogen absorbed in the hydrogen electrode 36 has been released therefrom and reacted with the oxygen, e.g., after a period of about 4 to 6 seconds, the fuel cell will cease operating.

Referring now to FIG. 3 showing a further modification of the invention fuel cell, numeral 56 is a plastic or fiberglass back plate which is sealed in physical contact against a palladium electrode 58, the opposite face of which is in engagement with an ion conducting membrane 62 composed of zirconium phosphate. A member 66 composed of plastic or fiberglass encloses the space adjacent the opposite face of the membrane 62, and a gasket 60 is provided between wall 56 and membrane 62 and a gasket 64 is disposed between wall member 66 and ion conducting membrane 62. A thin platinum black reducing catalyst electrode 67 is disposed against the face of membrane 62 adjacent wall 66, to form the oxygen cathode.

A specified amount of hydrogen is introduced via the inlet 68 and the valve 70 from a source of hydrogen indicated at 72, for absorption in the palladium anode 58.

Wires 73 and 74 connect electrodes 58 and 67 in an external circuit through a load 75. Mounted on the interior wall of the covering member 66 is a sealed fracturable thin plastic container 76 containing a solid source of oxygen such as potassium chlorate at 78. A threaded member 80 is mounted in the wall 66, such threaded member having a sharp point 81. When it is desired that the fuel cell be placed in operation, member 80 is turned so that it moves inwardly and the sharp point 81 thereof pierces the fracturable plastic container 76 to release hydrogen to the interior atmosphere or compartment adjacent the oxygen electrode 67. The cell then goes into operation for a short predetermined time as noted above, until the hydrogen which has been stored or absorbed in the palladium electrode 58 has been released therefrom, at which time the cell cuts off.

FIG. 4 shows a modification of the fuel cell of the invention, the embodiment of FIG. 4 being essentially the same as shown in FIG. 3 except that in FIG. 4 an oxygen inlet 82 is provided to the oxygen chamber indicated at 83 so that when it is desired to set the fuel cell in operation a supply of oxygen is introduced via inlet 82 and a valve 84 to the oxygen chamber and supplying a sufficient or excess amount of oxygen for reaction with the entire amount of hydrogen absorbed in the palladium electrode 58 as previously noted, so that following release of all of such hydrogen the fuel cell will then cease operation. Alternatively, the fuel cell of FIG. 4 can be sealed with a supply of oxygen already contained in the oxygen compartment 83, as by introducing oxygen generating material such as sodium or potassium peroxide indicated at 86 into the chamber 83. Premature operation of such fuel cell is prevented by having an open switch 85 in the external circuit, and when it is desired to place the fuel cell in operation then the switch 85 is closed, causing the fuel cell to commence operating and to continue for the desired period of time until the hydrogen supply absorbed in the hydrogen electrode 58 has been completely released therefrom.

Now referring to FIG. 5 showing a further modification of the invention fuel cell, the fuel cell 88 comprises a pair of fiberglass back plates 89 which when assembled hold together a pair of adjacent plastic gaskets 90 and 91 with a central membrane 92 sandwiched between the gaskets 90 and 91. The ion conducting membrane 92 in this embodiment is an asbestos sheet impregnated with phosphoric acid as electrolyte.

Sandwiched between one of the back plates 89 and the membrane 92 is a strip 93 of palladium-silver alloy and on the opposite face of the membrane 92 there is positioned a platinum black catalyst indicated at 95. A platinized screen 96 is placed within the gasket 91, such screen being of a corrugated or mesh material such that when the unit is assembled one of the back plates 89 forces the screen 96 into contact with the catalyst electrode 95. An external circuit is provided by wires 97 and 98, one of which is connected to the palladium-silver electrode 93 and the other of which is connected to the platinized screen 96, the external circuit including the load 99.

The fuel cell 88 is provided with a flexible conduit 100 which passes through gasket 91 and communicates with the oxygen chamber provided between the oxygen electrode 95 and the adjacent back plate 89. Conduit 100 carries at its outer end a flexible housing 101 which is designed to receive a container 102 including therein an oxygen generating substance indicated at 106. The container 102 is flexible and has a thin fracturable plastic tip 104.

A predetermined amount of hydrogen is introduced via the valved inlet 93' into the palladium-silver electrode 93. When it is desired to place the cell in operation, pressure is applied to the flexible outer end 101 of the conduit 100, squeezing the plastic container 102 therein and fracturing the thin fracturable tip 104 of the container. The oxygen thus released from the container 102 via conduit 100 and passing into the oxygen chamber adjacent the oxygen electrode 95 sets the cell in operation and electrical current is generated in the external circuit for a period of time until the absorbed hydrogen in the palladium-silver electrode 93 has been completely released.

In all of the embodiments of FIGS. 1 to 5 above, just sufficient hydrogen is absorbed in the palladium or hydrogen electrode to produce operation of the cell for a specified and preferably short period of time so that the fuel cell operates essentially as a fuse or time controlled circuit, for such short period of time. The amount of oxidizer or oxygen provided for operation of these fuel cells is generally substantially larger than the amount necessary for reaction with all of the hydrogen.

The reducing or cathode catalyst, e.g., the oxygen catalyst electrode material, employed in the fuel cell can be composed of any conventional catalyst material for this purpose. Such catalyst materials include platinum, iridium, and gold; and also nickel-nickel oxide, and the oxides of silver, chromium, molybdenum, tungsten or the rare earths, in a strong alkaline environment, and the like.

As previously noted, the ion conducting material of the fuel cell can be any of the known types of materials employed for this purpose. Thus, such materials can be in the form of a membrane composed of an organic ion conducting material such as the polystyrene type ion exchanger membrane described above in connection with the system shown in FIG. 2 of the drawing. In addition, ion conducting membranes in the forms of inorganic ion exchange membranes such as hydrous oxides of zirconium, titanium or bismuth, and zirconium phosphates can be employed, as illustrated in FIGS. 3 and 4, and membranes composed of capillary type materials containing an electrolyte which has ion conducting properties, such as KOH-asbestos and $H_3PO_4$-asbestos membranes as illustrated in FIG. 5, or a filter paper with a suitable electrolyte can be utilized. Hence, the term "ion conducting material" as employed in the specification and claims is intended to denote any of the types of materials noted above.

Although in the preferred form of the invention, the oxidizer for the hydrogen absorbed in the palladium catalyst is oxygen, other oxidizers such as ozone, a halogen, e.g., chlorine or bromine, or sulfur alternatively can be employed. Where sulfur is employed as oxidizer in the fuel cell of the invention, such sulfur must be heated to produce sulfur vapors for reaction with the hydrogen liberated from the palladium electrode. Also, liquid oxidizers such as ozone, chlorine or bromine in liquid, e.g., aqueous, solution can be employed.

From the foregoing, it is seen that the invention provides a novel, simple and versatile fuel cell of miniature proportions, e.g., a hydrogen-oxygen, hydrogen-chlorine or hydrogen-bromine fuel cell, particularly the former, which is designed to generate current over a predetermined preferably short time interval and then to cut off sharply.

It will be understood that various modifications and adaptations of the invention can be made by those skilled in the art without departing from the spirit of the invention, and accordingly the invention is not to be taken as limited except by the scope of the appended claims.

I claim:

1. A self-timing fuel cell comprising an ion conducting material, a hydrogen catalyst electrode having one side in contact with said ion conducting material, said catalyst electrode being capable of absorbing hydrogen, mechanical means hermetically sealing the opposite side of said hydrogen electrode, a predetermined amount of hydrogen absorbed in said hydrogen electrode, a reducing catalyst electrode positioned on the other side of said ion conducting material, a zone adjacent to said reducing catalyst electrode, and means for supplying to said zone an oxidizer capable of being reduced at said reducing electrode into an ion which reacts with the hydrogen ion.

2. A self-timing fuel cell designed to operate and to generate an electric current for a predetermined short time interval, which comprises an ion conducting membrane, a palladium catalyst electrode capable of absorbing hydrogen positioned with one face thereof in contact with one side of said membrane, mechanical closure means hermetically sealing the opposite face of said palladium electrode, a predetermined amount of hydrogen absorbed in said palladium electrode, an oxygen catalyst electrode positioned with one face thereof in contact with the other side of said membrane, a gas chamber adjacent the opposite face of said oxygen electrode, and means for selectively controlling flow of a supply of oxygen to said chamber.

3. A fuel cell designed to operate and to generate an electric current for a predetermined short time interval, which comprises an ion conducting membrane, a palladium catalyst electrode capable of absorbing hydrogen positioned with one face thereof in contact with one side of said membrane, mechanical closure means hermetically sealing the opposite face of said palladium electrode, a predetermined amount of hydrogen absorbed in said palladium electrode, a reducing catalyst electrode positioned with one face thereof in contact with the other side of said membrane, a chamber adjacent the opposite face of said reducing electrode, a source of an oxidizer capable of being reduced at said reducing electrode into an ion which reacts with the hydrogen ion, said source being in communication with said chamber, and means selectively providing said oxidizer to said chamber.

4. A self-timing fuel cell designed to operate and to generate an electric current for a predetermined short time interval, which comprises an ion conducting membrane, a palladium catalyst electrode capable of absorbing hydrogen positioned with one face thereof in contact with one side of said membrane, mechanical closure means hermetically sealing the opposite face of said palladium electrode, a predetermined amount of hydrogen absorbed in said palladium electrode, a reducing catalyst electrode positioned with one face thereof in contact with the other side of said membrane, a gas chamber adjacent the opposite face of said reducing electrode, and means for selectively controlling flow of a supply of oxidizer in the form of a gas to said chamber into contact with said reducing electrode.

5. A self-timing fuel cell as defined in claim 4, wherein said palladium is a palladium-silver alloy.

References Cited

UNITED STATES PATENTS

| | | | |
|---|---|---|---|
| 2,996,564 | 8/1961 | Morton | 136—90 |
| 3,092,517 | 6/1963 | Oswin | 136—86 |
| 3,110,622 | 11/1963 | Hipp | 136—86 X |
| 3,132,972 | 5/1964 | Ludwig | 136—86 |
| 3,138,489 | 6/1964 | Schoeppe et al. | 136—90 X |
| 3,350,229 | 10/1967 | Justi | 136—86 |

FOREIGN PATENTS

| | | |
|---|---|---|
| 616,031 | 3/1961 | Canada. |
| 985,393 | 3/1965 | Great Britain. |

JOHN H. MACK, Primary Examiner

M. J. ANDREWS, Assistant Examiner

U.S. Cl. X.R.

136—90